Nov. 30, 1943.        S. E. ANGELL        2,335,469
TWIN WHEEL CONTROL
Filed Feb. 2, 1942        2 Sheets-Sheet 1

Stanton E. Angell
Inventor

Attorney

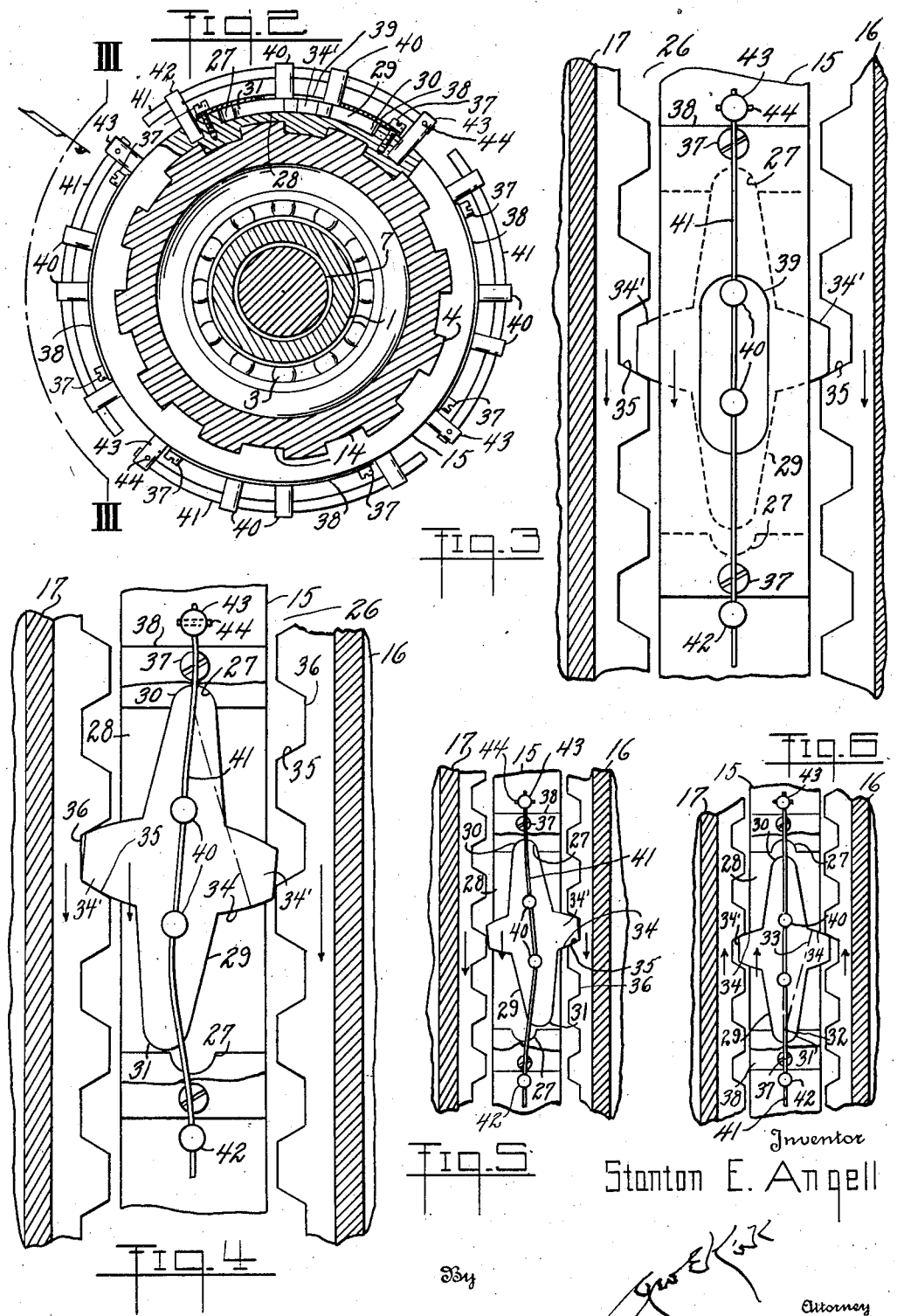

Patented Nov. 30, 1943

2,335,469

UNITED STATES PATENT OFFICE 2,335,469

TWIN WHEEL CONTROL

Stanton E. Angell, Dearborn, Mich.

Application February 2, 1942, Serial No. 429,270

7 Claims. (Cl. 192—50)

This invention relates to control compensation as to selected rotary member, more particularly between a pair thereof.

This invention has utility in differential control, more particularly for the rotation drive to be effective through an intermediate wobbler element to act on the lagging ground wheel.

Referring to the drawings:

Fig. 1 is a medial section, with parts broken away, through a twin wheel assembly such as may be adopted in live ground or traction wheels of a motor truck;

Fig. 2 is a section on the line II—II, Fig. 1, showing parts in section of the inter-wheel compensator or connector herein;

Fig. 3 is a view on the line III—II, Fig. 2, as developed, showing the wobbler in common transmitting relation for the pair of wheels;

Fig. 4 is a view of the wobbler, wherein the wheel or relatively rotary member at the right in Fig. 4 is overrunning and the wobbler or intermediate connector is thereby shifted into pick-up or transmitting relation to the wheel or relatively rotating or driven member at the left;

Fig. 5 is a view of the wobbler similar to Fig. 4 but with the reverse or lefthand member as the overrunning one, and the right being in the transmitting relation; and Fig. 6 is a reversal or counter for opposite functioning of the wobbler to that of Fig. 3.

Tubular axle or support 1 has thereon anti-friction bearings 2, 3, mounting sleeve 4 having connection by bolts 5 with head 6 of live axle 7, thereby controlling for transmission to the sleeve 4. The sleeve 4, remote from the head 6, has fixed therewith flange 8 carrying brake drum 9, with which may cooperate outer frictional brake 10 and inner frictional brake 11. Thrust bearing 12, as adjacent packing and the anti-friction bearing 2, and shield 13 about the tubular axle or support 1 are to minimize disturbance from foreign matter. This member or sleeve 4 is accordingly rotatable relatively to the support 1 and may serve through the live shaft 7 to drive, or from the brake drum 9 to oppose driving operation.

This sleeve 4 (Fig. 2) has key or seat portions 14, into which may be seated ring 15 (Fig. 1), in the control herein spacing inner hub portion 16 from outer hub portion 17. The inner hub portion 16 is rotatably mounted on the sleeve 4 and has wheel disk 18 therefrom to carry rim 19, say for mounting a pneumatic tire. Hub portion 17 has wheel web 20 therefrom to rim portion 21 for mounting additional pneumatic tire 22 in parallelism with the tire on the rim 19. Packing 23 may serve to reduce entrance of foreign matter from between the relatively rotatable wheels having the webs 18, 20, as such through their axles 16, 17, may tend to rotate on the sleeve 4. Bolts 24 mount hub cap 25 to shield this twin wheel section on the free or outboard side thereof. These hub portions 16, 17, therebetween form a chamber 26.

The ring 15 (Fig. 4) provides semi-circular concave seats 27 centrally thereof and spaced to form pocket 28 therebetween, in which is located wobbler 29. This wobbler 29 has semi-circular termini 30, 31, of configuration at straight midposition to register as to one thereof with a seat 27. From center 32, in which the seats 30, 31, are formed, there is radius line 33 determining an arc 34 for wobbler lug 34' as adapted to ride on side wall 35 of notch or seat 36 of the hub 17. Opposed thereto the hub 16 has notches 36 with side walls 35 thereto. Mounted by screws 37 with the ring 15 is plate 38 over the pocket or clearance 28, thereby tending to conceal or hold the wobbler 29 against displacement. This plate 38 has central longitudinal opening 39 (Fig. 3). Protruding through this opening 39, posts 40 fixed with the wobbler 29 carry spring 41, which in medial position for the wobbler extends in centrally straight position to posts 42, 43. The post 43 has key or locking means 44 to hold this strap spring 41 against displacement in this flex permitting set-up. It is to be noted that this spring 41 is yieldable means tending normally to hold this wobbler centralized so that at least the terminal portions of the arc faces 34 of the wobbler lugs 34' ride against the wall 35 not only of the hub 17 but of the hub 16. Under normal transmission or normal response to braking, this is the common connector relation, the transmission position being say as shown by the arrows in Fig. 3, with the ring 15 effecting the driving from the seat 27 as against the complementary seat 30 of the wobbler as the wobbler is medial. In the reverse direction or with the brakes applied, the ring direction of action would be converse to that of Fig. 1 (Fig. 3), and the opposite end 31 of the wobbler would be the one functioning between the ring 15 and the wobbler 29. There is accordingly in this connector a shiftable control adaptable automatically for uniform functioning between the two relatively rotatable members of the pair, herein dual wheels.

This compensation is to an extent for acting upon the less responsive member of the pair. In braking this would apply to the faster rotating wheel. In transmission it would apply to the wheel that was not overrunning or lagging. This selection is automatic for either of the pair. A control in this regard may be taken as the angle of friction between the arc face 34 and the opposing face 35. Such angle of friction, being the normal holding, is further opposed by the tendency of the spring 41 to resist flexing out of normal. Accordingly, there may be cooperation in this holding for friction to resist the spring. The functioning arises when there is sufficient unbalancing or out-of-step relation between the hubs 16, 17, to have the wedge action of the surface 35 act as a cam and, against the resistance of spring 41, move the wobbler 29 to such extent that the relatively advancing member, say 16 (Fig. 4), may continue its overrunning, and as so functioning maintain its camming action to thrust the opposite lug 34' fully into a seat 36 of the member 17. The wobbler 29 is thus in efficient position to retain its activity in pulling the hub 17 for pick-up, and such is maintained for allowing the relative rotation therebetween. This could be a divider action in a torque tube as between differentials, serve as a differential, or as localized for the compensation in a pair as a twin wheel or dual wheel construction. In the event the hub 17 has tendency to overrun or exceed in the direction of control, the transmission or retardation of the direction for the ring 15, there is oscillation of the wobbler or annular series of wobblers carried by the ring from the position as effecting transmission from the ring 15 to the hub 17 as from the ring 15 to the hub 16 (Fig. 5). In this wobble action of the member 29, it does not have longitudinal shifting relative to the ring as there is common direction for rotation. However, in reversal of such direction, the clearance between the seat 27 at one end and the seat 21 at the opposite end is such that the seat 30 clears as the opposite seat 31 enters for the wobbler 29 to respond in reversing the flexing direction for the spring 41 (Figs. 4, 5).

Under the disclosure herein, there is accordingly a control effective between a pair of rotary members to permit relative rotation therebetween independently of losing control. This does not allow one member, say as freely rotating or spinning, to disturb all control action. It does allow one member to run or spin providing such be not in the direction for control, that is, if it be in the direction sought to propel, or be stopped in the direction sought to apply the brake. There is thus at all times in this control an effective positioning of this ring to do with the behind-action member, a service promoting trait. Accordingly, the lagging member or wheel is the one to which the transmission action is effected, whether such be a transmission for speeding ahead to catch up with the overrunning wheel, or a pulling down toward stop when the other wheel has stopped.

In addition to the packing adjacent the shield 13, there is dust excluding packing 45 between the flange 8 and the hub 16. These hubs 16, 17, are retained assembled on the sleeve 4 by thrust washer 46 as adjusted thereagainst by nut 47.

What is claimed and is desired to secure by Letters Patent is:

1. A support providing bearings, a pair of rotatable members mounted on the support at the bearings, and rotation control means between the support and members including a connector therebetween normally set for effecting common drive operation of the members, and inter-member disturbance means selectively disconnecting the connector from both members for sole coaction upon one member.

2. A support providing bearings, a pair of rotatable members mounted on the support at the bearings, and rotation control means between the support and members including a connector therebetween, and a spring responsive to inter-member disturbance to shift the connector and normally positioning the connector for common transmitting operation between the members and against clearway from one thereof.

3. A support providing bearings, a pair of rotatable members mounted on the support at the bearings, rotation control means between the support and members including a wobbler therebetween, said members having seats to be engaged by the wobbler, and a mounting upon which the wobbler is movable, said mounting including a spring normally holding the wobbler in seating position as to said members.

4. A support providing bearings, a pair of rotatable members mounted on the support at the bearings, rotation control means between the support and members including a wobbler therebetween, and a pivotal mounting upon which the wobbler is movable responsive to automatic rotation control direction, said members having seats, said mounting including spring means for holding the wobbler normally cooperating for meshing with the seats of the different members.

5. A support providing bearings, a pair of rotatable members mounted on the support at the bearings, rotation control means between the support and members including a wobbler therebetween, and a pivotal mounting device upon which the wobbler is movable from inter-member disturbance to disconnect the wobbler from the member tending to overrun the control for rotation.

6. A support providing bearings, a pair of rotatable members mounted on the support at the bearings, rotation control means between the support and members including a wobbler therebetween, and a mounting upon which the wobbler is movable from inter-member disturbance to disconnect the wobbler from the member most responsive to brake operation, a brake, said members having seats, said mounting including a spring normally cooperating for common meshing relation of the wobbler with said seats in both of the members, said brake being effective through said mounting and spring to connect the wobbler to the member tending to overrun the control for brake operation.

7. A support providing bearings, a pair of rotatable members mounted on the support at the bearings, rotation control means between the support and members including a wobbler therebetween, and a mounting upon which the wobbler is movable from inter-member disturbance to disconnect the wobbler from the member tending to overrun the control for drive operation, said members having seats, said mounting including a spring normally cooperating for common meshing relation of the wobbler with a seat in each of the members, said drive being effective through said mounting and spring to disconnect the wobbler from the member tending to overrun the control for drive operation.

STANTON E. ANGELL.